US008132736B2

(12) United States Patent
Wild et al.

(10) Patent No.: US 8,132,736 B2

(45) Date of Patent: Mar. 13, 2012

(54) VALUE DOCUMENT COMPRISING A SECURITY ELEMENT

(75) Inventors: Heinrich Wild, Herzogenaurach (DE); Ludwig Brehm, Adelsdorf (DE)

(73) Assignee: Leonhard Kurz Stiftung & Co. KG, Furth (DE)

( * ) Notice: Subject to any disclaimer, the term of this patent is extended or adjusted under 35 U.S.C. 154(b) by 217 days.

(21) Appl. No.: 12/225,939

(22) PCT Filed: Apr. 2, 2007

(86) PCT No.: PCT/EP2007/002949

§ 371 (c)(1), (2), (4) Date: Dec. 4, 2008

(87) PCT Pub. No.: WO2007/115725

PCT Pub. Date: Oct. 18, 2007

(65) Prior Publication Data

US 2009/0308932 A1 Dec. 17, 2009

(30) Foreign Application Priority Data

Apr. 3, 2006 (DE) ......................... 10 2006 015 818

(51) Int. Cl.
*G06K 19/06* (2006.01)

(52) U.S. Cl. ......... 235/493; 235/487; 235/488; 235/492

(58) Field of Classification Search .................. 235/488, 235/487, 493, 492
See application file for complete search history.

(56) References Cited

U.S. PATENT DOCUMENTS

| | | | |
|---|---|---|---|
| 4,631,222 A | 12/1986 | Sander | |
| 4,662,653 A * | 5/1987 | Greenaway | 283/91 |
| 4,684,795 A | 8/1987 | Colgate, Jr. | |
| 5,336,871 A | 8/1994 | Colgate, Jr. | |
| 5,383,687 A * | 1/1995 | Suess et al. | 283/86 |
| 6,235,105 B1 * | 5/2001 | Hubbard et al. | 106/415 |
| 6,491,324 B1 * | 12/2002 | Schmitz et al. | 283/82 |
| 2005/0104364 A1 * | 5/2005 | Keller et al. | 283/72 |
| 2007/0166518 A1 | 7/2007 | Brehm | |
| 2008/0265040 A1 * | 10/2008 | Holmes et al. | 235/493 |

FOREIGN PATENT DOCUMENTS

| | | | |
|---|---|---|---|
| DE | 3422910 | C1 | 9/1985 |
| DE | 4212290 | | 5/1993 |
| DE | 19731968 | A1 | 1/1999 |
| DE | 10 2004004713 | A | 9/2005 |
| EP | 0609806 | | 8/1994 |
| EP | 0559069 | B1 | 6/1996 |
| EP | 1152369 | | 11/2001 |
| WO | WO 93/12506 | | 6/1993 |

OTHER PUBLICATIONS

Easteli, Christoper John, et al., Improvements in Security Devices, Decemeber 22, 2005, WO 2005/120855.*

* cited by examiner

*Primary Examiner* — Michael G Lee
*Assistant Examiner* — Tabitha Chedekel
(74) *Attorney, Agent, or Firm* — Hoffmann & Baron, LLP

(57) ABSTRACT

The invention relates to a document of value, in particular a credit card, identity card or ticket, and to a transfer film for the production of a document of value. The latter has on one of its surfaces a security element (2), which has a magnetic layer (25) for storing machine-readable information and a reflective, non-magnetizable metal layer (23). The metal layer is arranged above the magnetic layer (25) in relation to the surface of the document of value. The metal layer and the magnetic layer overlap, at least in some regions. The region of the metal layer (23) that overlaps the magnetic layer (25) is subdivided into at least two regions (231) isolated electrically from one another.

26 Claims, 4 Drawing Sheets

VALUE DOCUMENT COMPRISING A SECURITY ELEMENT

This application claims priority based on an International Application filed under the Patent Cooperation Treaty, PCT/EP2007/002949, filed on Apr. 2, 2007 and German Application No. DE 1020060/5818.0-53, filed on Apr. 3, 2006.

BACKGROUND OF THE INVENTION

The invention relates to a document of value, in particular a credit card, identity card or ticket, which on one of its surfaces has a security element which comprises a magnetic layer and a reflective metal layer. The invention further relates to a transfer film, in particular a hot embossing film, for the production of such a document of value.

Documents of value and embossing films of the type explained above are known, for example from DE 34 22 910 C1 or EP 0 559 069 B1. For example, DE 34 22 910 C1 describes an embossing film which has a magnetic layer, a metal layer and a protective varnish layer having an optically diffractive structure. EP 0 559 069 B1 describes the structure of a document of value having a metal layer and a magnetic layer; between the metal layer and the magnetic layer there is provided a barrier layer, which prevents any action of the magnetizable particles of the magnetic layer on the metal layer.

During use of documents of value of the type explained above, it has now surprisingly transpired that sporadic errors occur when reading information which is stored in the magnetic layer of the document of value. In addition to the occurrence of read errors, the failure of the entire reader when performing a read attempt has also been observed in individual cases.

SUMMARY OF THE INVENTION

The invention is, then, based on the object of minimizing the occurrence of errors when using a machine to read information out of a magnetic layer of a document of value of the type mentioned at the beginning.

This object is achieved by a document of value which on its surface has a security element, the security element having a magnetic layer for storing machine-readable information and a reflective, non-magnetizable metal layer, the metal layer being arranged above the magnetic layer in relation to the surface of the document of value, the metal layer and the magnetic layer overlapping, at least in some regions, and the region of the metal layer that overlaps the magnetic layer being subdivided into at least two regions isolated electrically from one another. This object is further achieved by a transfer film, in particular a hot embossing film, for the production of such a document of value, which has a carrier film and a transfer layer that can be separated from the carrier film and has a magnetic layer for storing machine-readable information and a reflective, non-magnetizable metal layer, the metal layer being arranged between the carrier film and the magnetic layer, the metal layer and the magnetic layer overlapping, at least in some regions, and the region of the metal layer that overlaps the magnetic layer being subdivided into at least two regions isolated electrically from one another.

Here, the invention is based on the finding that the read errors occurring in documents of value of the type mentioned at the beginning can be traced back to an accumulation of electric charge on the metal layer of the document of value, which, during the use of the document of value, is caused by charge transport from the body of the user to the metal layer of the document of value. Given the occurrence of specific ambient conditions, the charge accumulated on the body of the user as a result of electrostatic charging is transferred to the metal layer of the document of value or coupled capacitively into the latter during the use of/contact with the document of value. The fact that the region of the metal layer that overlaps the magnetic layer is subdivided into at least two regions isolated electrically from one another means firstly that the charge that can be accumulated on the metal layer as a result of such effects is reduced considerably. Furthermore, in this way an isolation of the potential between a region of the metal layer coupled electrically/capacitively to the human user and the region of the metal layer of the document of value arranged in the immediate vicinity of the read head is achieved. As a result, the occurrence of the above-described interference is prevented effectively and the occurrence of read errors is reduced substantially.

Advantageous refinements of the invention are designated in the subclaims.

According to a preferred exemplary embodiment of the invention, the magnetic layer of the security element is molded in the form of a strip and the region of the metal layer overlapping the magnetic layer is subdivided transversely with respect to the longitudinal direction of the strip into at least two regions isolated electrically from one another. As a result of the separation of the metal layer transversely with respect to the longitudinal direction of the strip, even when use is made of read heads which cover the entire width of the strip-like magnetic layer, reliable isolation of the potential between the human user and the regions of the metal layer lying directly under the read head is made possible. Given this subdivision of the metal layer, there are no continuous, electrically coupled areas present in the longitudinal direction of the strip, so that different potentials can build up in the longitudinal direction of the strip.

The regions of the metal layer that are isolated electrically from one another transversely with respect to the longitudinal direction of the strip preferably have a maximum width which corresponds to the minimum spacing between the slot of the reader and the read head of the reader. The width of the regions of the metal layer isolated electrically from one another transversely with respect to the longitudinal direction of the strip thus has a maximum width of about 20 mm, preferably between 5 mm and 1 mm. In this way, in each position of the document of value in relation to the read head, a region of the metal layer coupled to the potential of the human user is prevented from getting into the vicinity of the read head and being able to cause interference with the acquisition of the signal or a spark breakdown there. However, it is also possible for the metal layer to be subdivided into only two regions isolated electrically from one another, the transverse division then preferably being carried out as a function of the position of the read head in the reader.

In order to subdivide the metal layer into at least two regions isolated electrically from one another, it has proven worthwhile to provide, in the region of the metal layer that overlaps the magnetic layer, a large number of island-like metallic regions, which are in each case separated from one another by metal-free regions. In this case, regions of the metal layer isolated electrically from one another are to be understood to be regions of the metal layer which are not electrically conductively connected to one another via an electrically conductive connection, therefore, for example, constitute island-like regions of the metal layer which are not connected to one another by metallic regions of the metal layer or by other conductive regions of the layers of the security element located above or below said metal layer. Non-conductive layers are in this case composed of a dielectric material, for example.

The island-like metallic regions of the metal layer preferably have an area of less than 100 $mm^2$. In this way, the charge that can be picked up by the island-like metallic region is limited in such a way that, for the predominant number of applications, interference with the reading process by the charge possibly coupled in in this region by the use of the document of value does not occur. Furthermore, it has proven to be advantageous that the width of the metal-free regions is at least 10 μm, preferably between 30 μm and 100 μm. In this way, an adequate breakdown voltage resistance is achieved with little effect on the overall visual appearance.

According to a further preferred exemplary embodiment of the invention, the island-like metallic regions of the metal layer each have a width of less than 400 μm, preferably a width between 200 μm and 400 μm. In this way, the subdivision of the metal layer into regions isolated electrically from one another is no longer detectable or is barely detectable by the human observer and therefore the visual appearance of the security element is not affected by the technical measures taken. In order to ensure an adequate reflective action of the metal layer, the ratio of the total area of the island-like metallic regions to the area of the metal-free regions separating these regions must in each case be chosen to be greater than 6, preferably greater than 9.

Furthermore, it has proven worthwhile to arrange the island-like metallic regions in a line grid or surface grid with a grid width D. In this case, the line grid is preferably oriented in relation to the longitudinal axis of the magnetic layer such that the lines of the line grid are oriented transversely with respect to the longitudinal axis of the magnetic layer. In addition to a conventional two-dimensional surface grid which is oriented on two mutually orthogonal axes, it is also possible to use a geometrically transformed line or surface grid which, for example, is oriented on wavy or circular axes.

The island-like metallic regions are in each case preferably arranged at a constant distance B from one another. The ratio of the grid width D preferably has a value from 5 to 200. The grid width D is preferably less than 300 μm.

According to a further preferred exemplary embodiment of the invention, a dielectric material is provided in the metal-free regions which separate the island-like metallic regions. In this way, the breakdown resistance of the electrical isolation of the regions is increased further. The dielectric material can in this case also be composed of a dispersion of reflective pigments in a dielectric binder. This makes it possible to increase the breakdown resistance further without having to accept reductions in the visual appearance of the metal layer. In this case, metal-free regions of the metal layer are to be understood to be regions of the metal layer in which no metallic coating is provided, or a metallic coating that has been applied has subsequently been removed again by means of ablation (laser ablation, mechanical removal), by means of etching (positive/negative etching) or a washing process.

The security element further has at least one dielectric layer, which is provided above the metal layer in relation to the surface of the document of value. This dielectric layer is in this case preferably formed by an optical security layer or a partial layer of an optical security layer.

Furthermore, it has proven worthwhile for the security element to have two or more metal-free edge regions, in which the metal layer—as already explained above—is not provided or has subsequently been removed and, moreover, a dielectric material is provided to encapsulate the metal layer. As a result of these measures, coupling of electric charge into the metal layer during the use of the document of value, for example during the touching of the security element by the human user, is largely prevented. Furthermore, provision can also be made for two or more edge regions of the metal layer to be isolated electrically from the central regions of the metal layer, which means that the same advantage is achieved. For instance, it is possible to provide on the long sides of the metal layer narrow edge regions isolated electrically from the central region of the metal layer, said regions having a thickness of 100 μm to 1 mm and laterally bounding a central metallic region, implemented over the entire area in certain circumstances.

According to a further preferred exemplary embodiment of the invention, the security element has a security layer which, under certain circumstances, is built up in many layers and is arranged above the metal layer in relation to the surface of the document of value. The security layer has, for example, a varnish layer in which an optically diffractive structure which exhibits an optically variable effect is molded. For instance, a hologram, a Kinegram® or a diffraction grating having a specific frequency of more than 300 lines/mm is molded into the varnish layer. Furthermore, it is also possible for a macro structure, for example a refractive micro lens pattern, a matt structure or an asymmetrical structure, for example a blaze grating, to be molded into the varnish layer. Furthermore, the security layer can also have an interference layer system which generates a color displacement effect dependent on viewing angle by means of interference. Such interference layer systems are distinguished by one or more spacer layers, of which the thickness meets the $\lambda/4$ or the $\lambda/2$ conditions for one or more wavelengths, preferably in the visible light range. The spacer layer in this case is preferably composed of a transparent dielectric material. Furthermore, it is also possible for the security layer to have a cross-linked liquid-crystal layer, in particular a cross-linked cholesteric liquid-crystal layer which exhibits a color change effect dependent on the viewing angle. Furthermore, it is also possible for the security layer to have layers which have a fluorescent or thermochromic material.

The metal layer is preferably composed of aluminum, chromium, silver, copper or gold or an alloy of at least two of these metals. Furthermore, between the magnetic layer and the metal layer, a varnish layer and/or a barrier layer are preferably provided, which prevent any action of the magnetic pigments present in the magnetic layer on the metal layer and also insulate the metal layer electrically with respect to the magnetic layer.

In the following text, the invention will be explained by way of example by using a number of exemplary embodiments and with the aid of the appended drawings.

DETAILED DESCRIPTION OF THE INVENTION

Figure 1:
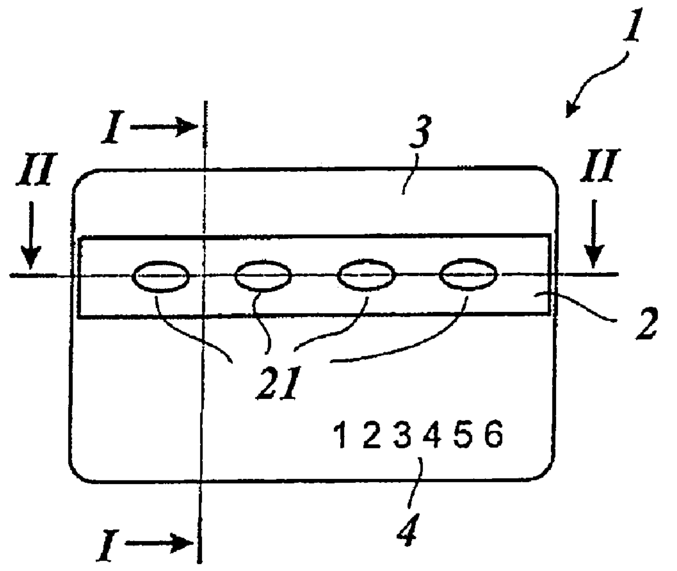
FIG. 1 shows a plan view of a document of value according to the invention.

FIG. 1 shows the rear side of a credit card 1. On the rear surface, the credit card 1 has a strip-like security element 2. The security feature 2 is arranged on a card-like carrier body 3 consisting of plastic, into which, for example, the name of the cardholder and the credit card number are embossed. The strip-like security element 2 can extend over the entire width of the credit card 1 or—as indicated in FIG. 1—only partly cover the width of the credit card 1. In this case, the strip-like security element 2 is molded in the form of a magnetic strip, as is normally provided in credit cards for the storage of machine-readable information. The security element 2 thus has a width of about 10 to 12 mm and a length of 82 mm, for example. Furthermore, the security element 2 is placed on the rear side of the credit card 1 in the same way as the magnetic strip of a conventional credit card, so that machine-readable information stored in the security element 2 can be read by the read head of a conventional reader.

As opposed to conventional magnetic strips, the security element 2 has a reflective metal layer, which imparts a metallically reflective visual appearance to the security element 2. Furthermore, the security element 2 has a plurality of optically variable security features 21, which are preferably optically diffractive security elements such as holograms, Kinegrams® or a diffraction grating generating a kinetic effect.

Besides the security element 2, the rear side of the credit card 1 also has an identifier 4 and, under certain circumstances, further optical security features.

Figure 2:
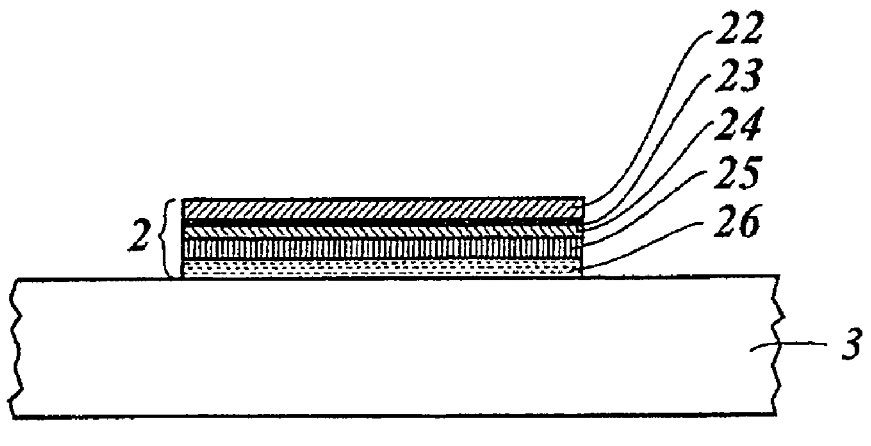
FIG. 2 shows a section along a line I-I through the document of value according to FIG. 1.

The structure of the security element 2 is now sketched by way of example in FIG. 2, which shows a section through the credit card 1 along the line I-I.

FIG. 2 shows the plastic body 3 and the security element 2 applied to the plastic body 3. The security element 2 has an adhesive layer 26, a magnetic layer 25 for storing machine-readable information, a varnish layer 24, a reflective, non-magnetizable metal layer 23 and an optical security layer 22.

The optical security layer 22 comprises a protective varnish layer and a replication varnish layer, into which an optically diffractive structure is introduced by means of an embossing punch or by means of UV replication. As already described above, instead of or in addition to a replication varnish layer with embossed optically diffractive structure, the security layer 22 can comprise one or more further layers which provide an optically detectable security feature, preferably in combination with the reflective metal layer 23. For instance, it is possible for the optical security layer to have a thin film layer system comprising an adsorption layer and a dielectric spacer layer which meets the $\lambda/4$ condition for a wavelength in the visible light range and thus, in combination with the metal layer 23, exhibits a color displacement effect dependent on viewing angle. Furthermore, it is also possible for the optical security layer 22 to have an orientation layer for the orientation of a liquid-crystal material and also one or more layers composed of a cross-linked and oriented liquid-crystal material which exhibits polarization of the light reflected back (nematic liquid-crystal material) and/or a color tilt effect dependent on viewing angle (cholesteric liquid-crystal material). Furthermore, it is also possible for the security layer 22 to have a layer with a repetitive micro pattern and an optically transparent layer arranged above this layer, into which a micro lens pattern is molded. The security layer 22 here preferably comprises one or more dielectric layers, the term "dielectric layer" in this connection comprising both organic and inorganic layers having dielectric properties (not electrically conductive). In this case, it is also possible for the optical security layer 22, besides one or more varnish layers and/or inorganic layers, also to comprise one or more layers composed of a plastic film, for example a polyester film.

The magnetic layer 24 is composed of a dispersion of magnetic pigments, which are usually iron oxide, in a binder. The magnetic layer in this case preferably has a thickness from 4 to 12 μm. Furthermore, it is also possible for the magnetic layer 24 to be composed of a sputtered-on layer of a magnetic material, it being possible in this case for the magnetic layer to be chosen to be considerably thinner.

The varnish layer 25 has a thickness of 0.2 to 5 μm. Instead of the varnish layer 25, it is also possible to provide a layer system of one or more layers, in particular a layer system comprising a barrier layer, which prevents any influence of the magnetizable particles of the magnetic layer on the reflective metal layer 23.

The metal layer 23 is applied to the security layer 22 by vapor deposition in vacuum. In this case, the metal layer 23 can consist of aluminum, but preferably consists of chromium, copper, silver or gold or an alloy of at least two of these metals. Furthermore, it is also possible for the metal layer 23 to consist of tin or a tin alloy.

The security element 2 can in this case be applied to the plastic body 3 as part of the transfer layer of a transfer film. However, it is also possible for one or more of the layers of the security element 2 to be applied directly to the plastic body 3, for example by a printing process, and for the other layers, for example the optical security layer 22 and the metal layer 23, to be applied to the layers, then as part of a transfer layer of a transfer film, for example a hot embossing film.

Figure 3:
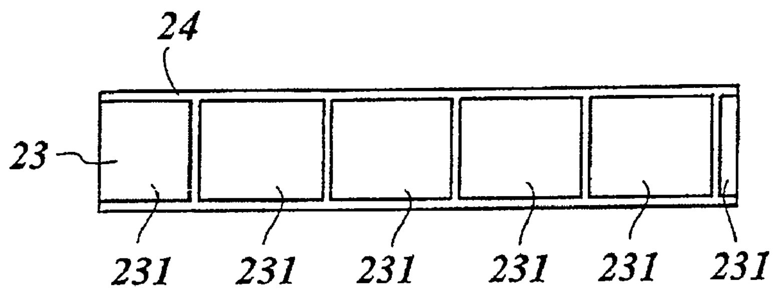
FIG. 3 shows a schematic illustration of the structuring of a metal layer of the document of value according to FIG. 1.

The metal layer 23 is structured in such a way that the region of the metal layer overlapping the magnetic layer is subdivided into at least two regions isolated electrically from one another. This is shown by way of example in FIG. 3, which illustrates a schematic plan view of the metal layer 23 and the layer stack of the security element 2 located underneath. As FIG. 3 shows, the metal layer 23 is formed from a large number of island-like metallic regions 231, which, in each case separated from one another by metal-free regions, are arranged between the varnish layer 24 and the optical security layer 22 and are thus isolated electrically from one another. The island-like regions 231 are in this case separated from one another transversely with respect to the longitudinal direction of the strip-like security element, so that the metal layer 23 is broken down in the longitudinal direction of the security element 2 into a large number of electrically decoupled regions. As indicated in FIG. 3, on the long sides of the security element 2 and in the plane of the metal layer 23, metal-free edge regions are provided, the width of which is between 10 μm and 1 mm. This also corresponds approximately to the width of the metal-free regions which separate the island-like metallic regions 231 from one another. The width of the island-like metallic regions 231 should preferably be chosen to be less than 10 mm but can also be chosen to be considerably larger, depending on the structure of the reader used. The security element 2 is preferably embossed from a strip-like transfer film, of which the metal layer is structured in accordance with a repetitive pattern. In this case, the distance between the regions of the metal layer 23 that are isolated electrically from one another is preferably chosen such that the maximum occurring width of the island-like regions 231 meets the above-described conditions for any desired positioning of the read head. Preferably, the island-like metallic regions 231 thus have a width between 5 mm and 1 mm and an area of less than 100 $mm^2$.

Figure 4:
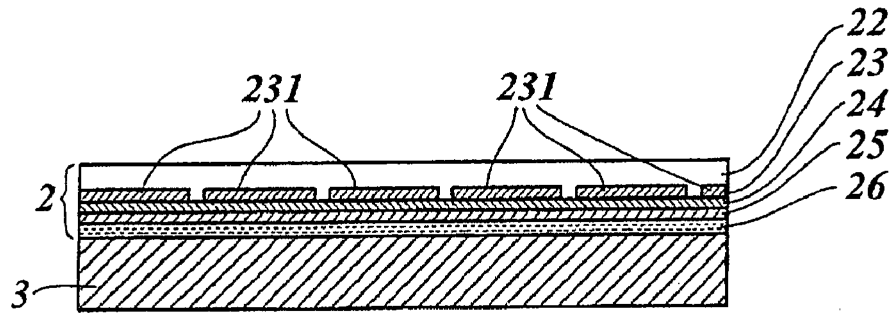
FIG. 4 shows a section along a line II-II through the document of value according to FIG. 1.

FIG. 4 now shows a section through the credit card 1 according to the line II-II indicated in FIG. 1. FIG. 4 shows the plastic body 3 and the security element 2 with the adhesive layer 26, the magnetic layer 25, the varnish layer 24, the metal layer 23 and the optical security layer 22. In this case, the metal layer 23 is subdivided into the island-like metallic regions 231. As indicated in FIG. 4, in the metal-free regions separating the island-like metallic regions and in the plane of the metal layer 23, a dielectric material, for example a varnish, is provided. For instance, following the vapor deposition of the metal layer 23, the latter is structured by means of a lift-off process or lithographic process and then provided with the varnish layer 24 over the entire area, which means that the metal-free regions between the island-like metallic regions 231 are filled with a varnish.

Figure 5:
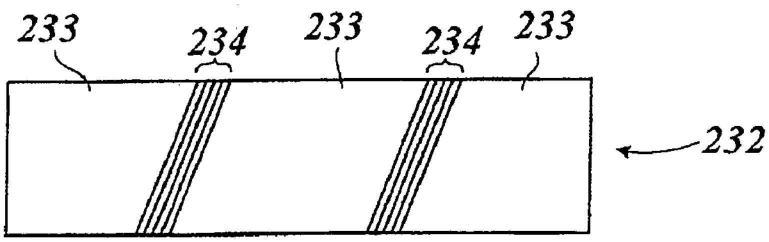
FIG. 5 shows a schematic illustration of a metal layer of the document of value according to FIG. 1 according to a further exemplary embodiment of the invention.

FIG. 5 shows a further possible structuring of the metal layer of the security element 2. The metal layer 232 sketched in FIG. 5 has island-like metallic regions 233 which are separated from one another by a nonconductive region 234. The nonconductive region 234 is a region in which there is a large number of microscopically fine, island-like metallic regions which have a width of less than 400 μm, preferably of less than 200 μm. Furthermore, in this region the ratio of the total areas of the microscopically fine, island-like metallic regions to the area of the separating metal-free regions present in these regions is chosen to be greater than 6, preferably greater than 9, so that the regions 234 appear to the human observer as whole-area, metallically reflective areas. With regard to the dimensions of the island-like metallic regions 233, that already described above in relation to FIG. 3 applies. The nonconductive regions 234 can have a relatively large area dimension, for example an area dimension of greater than 10 $mm^2$, so that a high breakdown resistance can be achieved between adjacent island-like metallic regions 233 without the overall visual impression being influenced significantly thereby.

Figure 6:
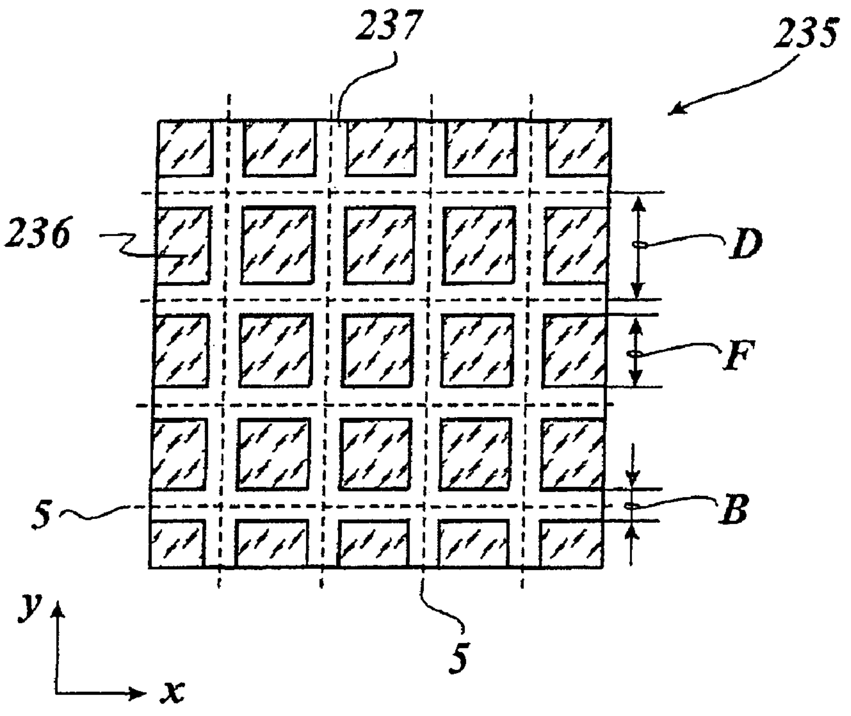
FIG. 6 shows a schematic illustration of a metal layer of the document of value according to FIG. 1 according to a further exemplary embodiment of the invention.

FIG. 6 illustrates a further possible structuring of the metal layer of the security element 2. FIG. 6 shows as a detail a region of a metal layer 235 which is formed from a large number of island-like metallic regions 236, which are arranged in a surface grid having a grid width D. Here, the island-like metallic regions 236 having the width F are in each case arranged at a distance B from one another. The ratio of the grid width D to the distance B is preferably chosen in the range from 5 to 200, by which means, firstly, a high breakdown resistance between the metallic regions 236 is achieved and, secondly, the metallically reflective impression of the metal layer 235 is maintained. The grid width D is preferably chosen to be less than 300 μm. As already described above, the metal-free regions 237 of the metal layer 235 provided between the island-like metallic regions 236 are filled with a dielectric material. Of course, it is also possible, instead of a surface grid, also to use a line grid or a geometrically transformed surface or line grid or to choose the grid width to be different in the x and y directions.

Figure 7:
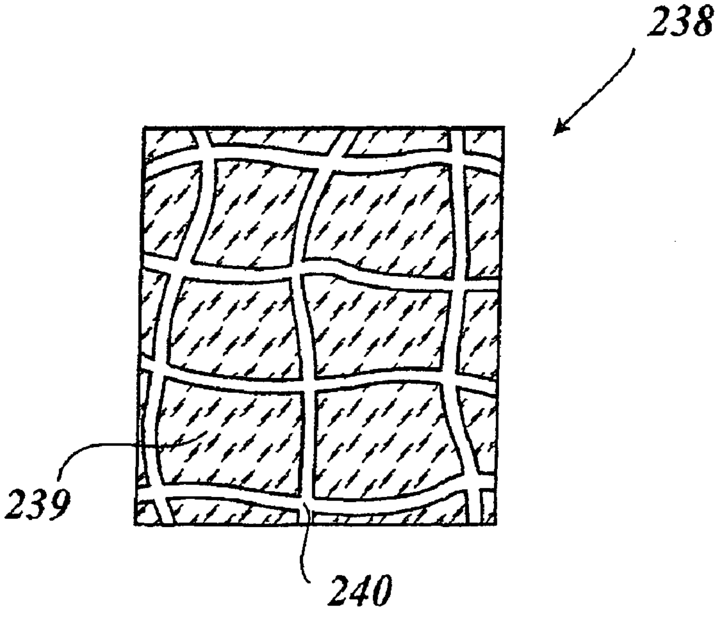
FIG. 7 shows a schematic illustration of a metal layer of the document of value according to FIG. 1 according to a further exemplary embodiment of the invention.
Figure 8:
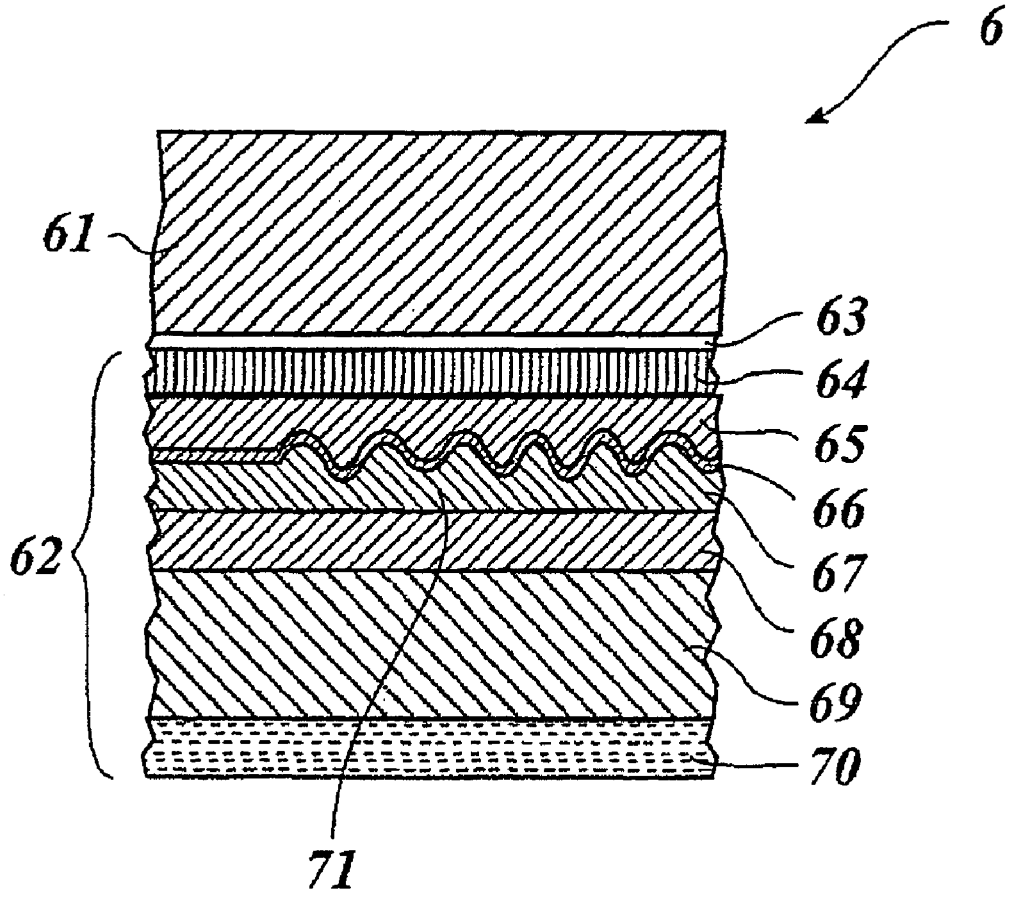
FIG. 8 shows a detail of a schematic section through a transfer film according to the invention.

Furthermore, it is also possible to structure the metal layer of the security element 2 as indicated in FIG. 7. FIG. 7 shows a metal layer 238 in which a large number of island-like metal layers 239 are separated from one another by a metal-free region 40. In the exemplary embodiment according to FIG. 7, the width of the randomly or quasi randomly shaped island-like metallic regions 239 is preferably smaller than 200 μm and the distance between the island-like metallic regions should be chosen in such a way that the total area of the island-like metallic regions to the metal-free regions is on average greater than 9 and thus the visual impression of the metal layer 238 is not affected by the structuring into island-like regions. The metal layer 238 shown in FIG. 7 can be formed, for example, by the vapor deposition of a Sn layer onto an unseeded varnish layer. The formation of an island layer is carried out in this way; the metal layer is composed of a large number of small platelets spaced apart from one another and having a platelet diameter of less than 1 μm.

FIG. 6 shows a transfer film 6 for the production of the document of value according to FIG. 1. The transfer film 6 comprises a carrier film 61, a release layer 63 and a transfer layer 62 having a protective varnish layer 64, a replication varnish layer 65, a metal layer 66, an adhesion promoter layer 67, a barrier layer 68, a magnetic layer 69 and an adhesive layer 70. The carrier film 10 is formed from a plastic film, preferably from a polyester film with a thickness of 12 to 23 μm. To this polyester film, the following layers are applied, preferably by means of a gravure printing roll, and if necessary dried. The release layer 63 applied in this case is preferably a layer of a wax-like material. The protective varnish layer 64 and the replication varnish layer 65 have a thickness of 0.3 to 1.2 μm. The replication varnish layer 65 is composed of a thermoplastic varnish into which, by means of a heated rotating embossing cylinder or by means of displacement embossing, an optically diffractive structure 71, for example a hologram or a Kinegram®, is embossed. A wash-varnish layer is then printed onto the replication varnish layer 66 in the regions in which the metal layer 66 is to be interrupted by metal-free regions. The metal layer 66 is then vapor deposited and the wash-varnish layer and the regions of the metal layer 66 located above the latter are then removed by means of a washing process. Instead of such structuring of the metal layer 66, the metal layer can also be structured by means of an etching process. For this purpose, following the vapor deposition of the metal layer 66 on the replication varnish layer 65, an etch resist or an etching agent is printed onto the metal layer 66 in the form of a pattern. Furthermore, it is also possible for the metal layer 66 to be removed in some areas by means of a lithographic process or by means of a laser in order to form the above-described regions of the metal layer isolated electrically from one another.

The adhesion promoter layer 67, the barrier layer 68, the magnetic layer 69 and the adhesive layer 70 are then printed on. The metal layer 66 has a thickness of 0.01 to 0.04 μm. The adhesion promoter layer 12 has a thickness of 0.2 to 0.7 μm. The barrier layer 68 has a thickness of 0.5 to 5 μm. The magnetic layer 69 has a thickness of 4 to 12 μm, preferably of about 9 μm. The adhesive layer 70 has a thickness of 0.3 to 1.2 μm.

The various layers of the transfer film 6 can be composed as follows:

Replication Varnish Layer 65

| Component | Parts by weight |
|---|---|
| High molecular weight PMMA resin | 2000 |
| Oil-free silicone alkyd | 300 |
| Non-ionic wetting agent | 50 |
| Methyl ethyl ketone | 750 |
| Low-viscosity nitrocellulose | 12000 |
| Toluene | 2000 |
| Diacetone alcohol | 2500 |

Metal Layer 66

Layer of aluminum, chromium, copper, silver or gold or alloys thereof vapor-deposited in vacuum.

Adhesion Promoter Layer 67

| Component | Parts by weight |
|---|---|
| High molecular weight PVC-PVAc copolymer | 1200 |
| Methyl ethyl ketone | 3400 |
| Toluene | 1000 |
| Matting agent | 100 |

Barrier Layer 68

| Component | Parts by weight |
|---|---|
| Methyl ethyl ketone | 30 |
| Toluene | 35 |
| Ethyl alcohol | 15 |
| Vinyl chloride-vinyl acetate copolymers FP: >65° C. | 11 |
| Unsaturated polyester resin (Fp: 100° C., d = 1.24 g/cm$^3$) | 3 |
| Silicone polyester resin (D = 1.18 g/cm$^3$) | 2 |
| Hydrophobicized silicic acid (pH ≧ 7 of a 5% slurry in $H_2O$) | 4 |

Magnetic Layer 69

This is composed of a dispersion of needle-like $\gamma$-$Fe_2O_3$ magnetic pigments in a polyurethane binder, various varnish aids and a solvent mixture of methyl ethyl ketone and tetrahydrofuran. However, the magnetic layer does not have to have this composition. Instead of the $Fe_2O_3$ pigments, for example other magnetic pigments, for example Co-doped magnetic iron oxides or other finely dispersed magnetic materials (Sr, Ba ferrites) can also be used. The binder combination of the magnetic layer 69 can also possibly be chosen such that it is possible to dispense with the adhesion promoter layer, since good adhesion directly to the metal is the direct result, which can be of significance if the barrier layer 68 is left out.

Adhesive Layer 70

The adhesive layer 70 can be a hot adhesive layer known per se. However, the application of this layer is not always necessary. This depends on the composition of the substrate in the document of value onto which the embossing film is to be embossed. If the substrate consists of PVC, for example, as is normally the case in credit cards, it is normally possible to dispense with a special hot adhesive layer.

The invention claimed is:

1. A document of value, which on one of its surfaces has a security element, wherein the security element has a magnetic layer for storing machine-readable information and no more than one reflective, non-magnetizable metal layer, the single metal layer being arranged above the magnetic layer in relation to the surface of the document of value, the metal layer and the magnetic layer overlapping, at least in some regions, and the region of the metal layer that overlaps the magnetic layer being subdivided into at least two regions isolated electrically from one another, wherein the region of the metal layer that overlaps the magnetic layer has a large number of island-like metallic regions, which are in each case separated from one another by metal-free regions, and wherein the island-like metallic regions of the metal layer each have an area of less than 100 mm$^2$, and wherein the ratio of the total area of the island-like metallic regions to the area of the metal-free regions separating these regions in each case is greater than 6.

2. The document of value as claimed in claim 1, wherein the magnetic layer of the security element is molded in the form of a strip and the region of the metal layer overlapping the magnetic layer is subdivided transversely with respect to the longitudinal direction of the strip into at least two regions isolated electrically from one another.

3. The document of value as claimed in claim 2, wherein the regions of the metal layer isolated electrically from one another transversely with respect to the longitudinal direction of the strip have a maximum width of 20 mm.

4. The document of value as claimed in claim 1, wherein the island-like metallic regions of the metal layer each have a width of less than 400 μm.

5. The document of value as claimed in claim 1, wherein the width of the metal-free regions is at least 10 μm.

6. The document of value as claimed in claim 1, wherein a dielectric material is provided in the metal-free regions which separate the island-like metallic regions.

7. The document of value as claimed in claim 6, wherein the dielectric material is composed of a dispersion of reflective pigments in a dielectric binder.

8. The document of value as claimed in claim 1, wherein the security element has at least one dielectric layer, which is provided above the metal layer in relation to the surface of the document of value.

9. The document of value as claimed in claim 1, wherein two or more edge regions of the metal layer are isolated electrically from the central regions of the metal layer.

10. The document of value as claimed in claim 1, wherein the security element has two or more metal-free edge regions, in which a dielectric material is provided to encapsulate the metal layer.

11. The document of value as claimed in claim 1, wherein an optically diffractive structure is molded in the metal layer.

12. The document of value as claimed in claim 1, wherein the security element has a security layer which is arranged above the metal layer in relation to the surface of the document of value.

13. The document of value as claimed in claim 12, wherein the security layer has a varnish layer, in which an optically diffractive structure is molded.

14. The document of value as claimed in claim 12, wherein the security layer has an interference layer system which generates a color displacement effect dependent on viewing angle by means of interference.

15. The document of value as claimed in claim 12, wherein the security layer has a cross-linked liquid-crystal layer.

16. The document of value as claimed in claim 1, wherein the magnetic layer is composed of a dispersion of magnetic particles in a binder.

17. The document of value as claimed in claim 1, wherein a varnish layer is provided between the magnetic layer and the metal layer.

18. The document of value as claimed in claim 1, wherein a barrier layer is provided between the magnetic layer and the metal layer.

19. The document of value as claimed in claim 18, wherein the barrier layer has a thickness of 2 to 3 μm.

20. The document of value as claimed in claim 1, wherein the metal layer is composed of aluminum, copper, tin, chromium or silver.

21. The document of value as claimed in claim 1, wherein the metal layer is structured by means of a wash-varnish process.

22. A document of value, which on one of its surfaces has a security element, wherein the security element has a magnetic layer for storing machine-readable information and no more than one reflective, non-magnetizable metal layer, the single metal layer being arranged above the magnetic layer in relation to the surface of the document of value, the metal layer and the magnetic layer overlapping, at least in some regions, and the region of the metal layer that overlaps the magnetic layer being subdivided into at least two regions isolated electrically from one another, wherein the region of the metal layer that overlaps the magnetic layer has a large number of island-like metallic regions, which are in each case separated from one another by metal-free regions, and wherein the island-like metallic regions are arranged in a line grid or surface grid with a grid width D, the island-like metallic regions in each case being arranged at a distance B from one another and the ratio of the grid width D to the distance B being chosen in the range from 5 to 200.

23. The document of value as claimed in claim 22, wherein the island-like metallic regions of the metal layer each have an area of less than 100 $mm^2$.

24. The document of value as claimed in claim 22, wherein the ratio of the total area of the island-like metallic regions to the area of the metal-free regions separating these regions in each case is greater than 6.

25. The document of value as claimed in claim 22, wherein the grid width D is less than 300 μm.

26. A transfer film for the production of a document of value as claimed in claim 1, wherein the transfer film has a carrier film and a transfer layer that can be separated from the carrier film and has a magnetic layer for storing machine-readable information and no more than one reflective, non-magnetizable metal layer, the single metal layer being arranged between the carrier film and the magnetic layer the metal layer and the magnetic layer overlapping, at least in some regions, and the region of the metal layer that overlaps the magnetic layer being subdivided into at least two regions isolated electrically from one another, wherein the region of the metal layer that overlaps the magnetic layer has a large number of island-like metallic regions, which are in each case separated from one another by metal-free regions, and wherein the island-like metallic regions of the metal layer each have an area of less than 100 $mm^2$, and wherein the ratio of the total area of the island-like metallic regions to the area of the metal-free regions separating these regions in each case is greater than 6.

* * * * *